US009739377B2

(12) United States Patent
Travnicek et al.

(10) Patent No.: US 9,739,377 B2
(45) Date of Patent: Aug. 22, 2017

(54) TRIPLE SEALING SEAT FOR A CONDUIT GATE VALVE

(71) Applicant: Z&J Technologies GmbH, Dueren (DE)

(72) Inventors: Roland Travnicek, Dueren (DE); Peter Weidgang, Dueren (DE); Ingo Wirtz, Eschweiler (DE)

(73) Assignee: Z&J Technologies GmbH, Dueren (DE)

( * ) Notice: Subject to any disclaimer, the term of this patent is extended or adjusted under 35 U.S.C. 154(b) by 0 days.

(21) Appl. No.: 15/072,944

(22) Filed: Mar. 17, 2016

(65) Prior Publication Data
US 2016/0281850 A1    Sep. 29, 2016

(30) Foreign Application Priority Data

Mar. 26, 2015    (DE) .................... 10 2015 104 556

(51) Int. Cl.
| F16K 3/02 | (2006.01) |
| F16J 15/00 | (2006.01) |
| F16J 15/40 | (2006.01) |

(52) U.S. Cl.
CPC ............. *F16J 15/002* (2013.01); *F16J 15/40* (2013.01); *F16K 3/0236* (2013.01)

(58) Field of Classification Search
CPC ......... F16J 15/002; F16J 15/40; F16K 3/0236
(Continued)

(56) References Cited

U.S. PATENT DOCUMENTS

| 1,868,147 A | * | 7/1932 | Kruse | .................... F16K 3/207 |
| | | | | 251/172 |
| 2,148,628 A | * | 2/1939 | Laurent | ................... F16K 3/186 |
| | | | | 137/246 |

(Continued)

FOREIGN PATENT DOCUMENTS

EP    0932780 B1    10/2001

OTHER PUBLICATIONS

German Patent and Trade Mark Office, Office Action for Application No. 102015104556.7, Feb. 8, 2016, 6 pages, Germany. (English translation only).

(Continued)

*Primary Examiner* — John Bastianelli
(74) *Attorney, Agent, or Firm* — Alston & Bird LLP

(57) ABSTRACT

A triple sealing seat is provided in a conduit gate valve having at least one shut-off plate which is displaceable between an open and closed position with respect to the conduit. The triple sealing seat forms a substantially annular sealing surface. In order to increase the tightness, the annular sealing surface comprises a radial interior sealing and scraping edge which can be contacted with the shut-off plate during operation. Also provided is a first circumferential groove located radially further outside which is in communication with a first gas channel and to which a sealing gas pressure can be applied. Also provided is a second circumferential groove located radially further outside which is in communication with a second gas channel and to which a sealing gas pressure can be applied. Moreover a single-plate gate valve and a double-plate gate valve comprising the triple sealing seat are disclosed, along with a method for sealing a shut-off plate of a conduit gate valve by using the triple sealing seat.

8 Claims, 1 Drawing Sheet

(58) Field of Classification Search
USPC .... 251/326–329, 175, 193; 137/246–246.12, 137/242; 277/646
See application file for complete search history.

(56) References Cited

U.S. PATENT DOCUMENTS

| | | | |
|---|---|---|---|
| 2,605,078 A * | 7/1952 | Volpin | ...................... F16K 3/36 |
| | | | 137/246.11 |
| 2,660,397 A | 11/1953 | Volpin | |
| RE23,957 E | 3/1955 | Volpin | |
| 3,095,004 A | 6/1963 | Jackson, Jr. et al. | |
| 3,367,625 A * | 2/1968 | Fortune | .................. F16K 3/207 |
| | | | 251/328 |
| 4,647,005 A * | 3/1987 | Hunter | .................... E21B 34/02 |
| | | | 251/175 |
| 5,133,561 A | 7/1992 | Hattori et al. | |
| 5,533,736 A | 7/1996 | Yamaga | |
| 5,927,684 A | 7/1999 | Marx et al. | |
| 7,806,383 B2 * | 10/2010 | Tran | ................. H01L 21/67126 |
| | | | 251/175 |
| 9,416,881 B2 | 8/2016 | Takeda et al. | |
| 2014/0231691 A1 | 8/2014 | Takeda et al. | |

OTHER PUBLICATIONS

German Patent and Trade Mark Office, Office Action for Application No. 102015104556.7, Feb. 8, 2016, 10 pages, Germany.

\* cited by examiner

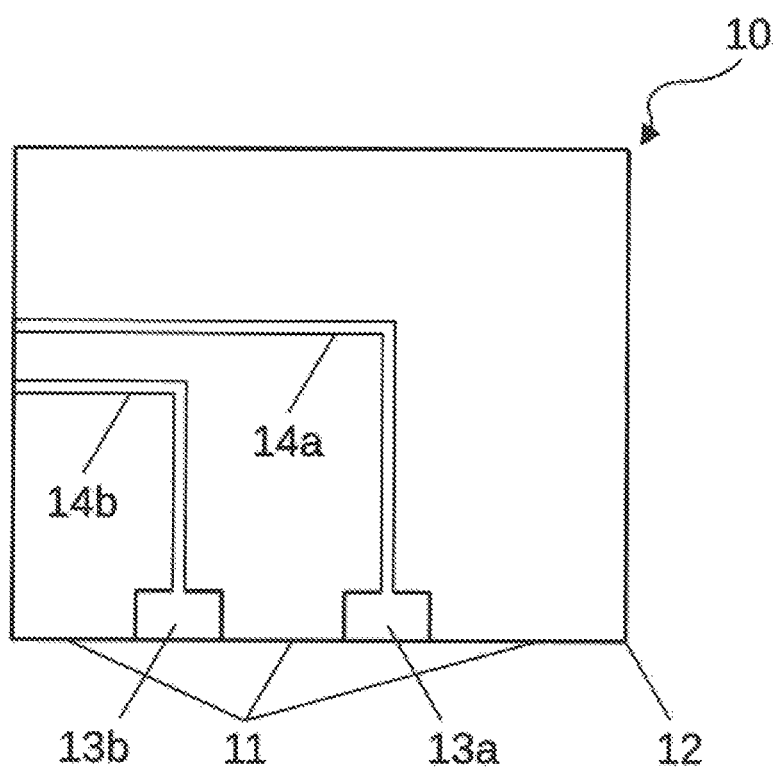

TRIPLE SEALING SEAT FOR A CONDUIT GATE VALVE

CROSS-REFERENCE TO RELATED APPLICATIONS

This application claims priority to and the benefit of German Application No. 10 2015 104 556.7, filed Mar. 26, 2015, the contents of which as are hereby incorporated by reference herein in their entirety.

BACKGROUND

Technical Field

The invention relates to a triple sealing seat with gas flushing for a conduit gate valve having the features described herein and outlined in the pending claims, as well as a conduit gate valve for chemical and petrochemical plants, and a method for sealing a shut-off plate of a conduit gate valve.

Description of Related Art

Sealing seats for conduit gate valves are known from the prior art. Patent document EP 0 932 780 B1 should be mentioned here as an example. The conduit gate valve disclosed herein is a single-plate pipe gate valve featuring a shut-off plate which is displaceable between an open and a closed position within the conduit gate valve's housing. This conduit gate valve is employed in chemical, in particular petrochemical plants and, by way of example, serves the purpose of obturating a coking drum. In this case, a sealing ring resting against the circumference of the shut-off plate in the closed position of the conduit gate valve is pre-stressed by spring elements and pressed against the shut-off plate so as to seal the conduit gate valve.

This construction has several drawbacks. On the one hand, the seal formed in this way is composed of several structural parts, a fact which complicates the installation and removal accordingly. Furthermore, the sealing surfaces of the sealing ring wear easily during displacement of the shut-off plate since they are pressed against the shut-off plate by the spring elements and exposed to abrasion. The spring elements themselves wear also and may lead to failure of the sealing function. Of particular importance are here also leakages with respect to gases which are formed during the coking process and may enter the interior of the conduit gate valve's housing.

BRIEF SUMMARY

The object of the present invention is therefore to create a seal for a conduit gate valve which excels in high tightness and features low susceptibility to wear.

This object is solved by a triple sealing seat as well as a conduit gate valve according to the recited claims, and a method for sealing a shut-off plate of a conduit gate valve according to the recited claims.

The object is in particular solved by a triple sealing seat for a conduit gate valve having at least one shut-off plate which is displaceable between an open and closed position with respect to the conduit, wherein the triple sealing seat forms a substantially annular sealing surface, wherein the annular sealing surface comprises a radial interior sealing and scraping edge which can be contacted with the shut-off plate during operation, as well as a first circumferential groove located radially further outside which is in communication with a first gas channel and to which a sealing gas pressure can be applied, as well as a second circumferential groove located radially further outside which is in communication with a second gas channel and to which a sealing gas pressure can be applied.

An advantageous detail of the invention in this case is that the inventive sealing seat has a triple sealing action. The sealing and scraping edge establishes contact with the shut-off plate and seals against solid matters. Due to the use of two circumferential grooves to which sealing gas is applied, two sealing gas barriers are generated by means of which the conduit gate valve's interior is effectively protected against process gases from a plant to be obturated. The grooves divide the annular sealing surface in this case in at least two concentric sealing surfaces which contribute to seal the areas between the grooves.

With the triple seal being designed in this way, it is furthermore not necessary for the triple sealing seat to be pressed against the shut-off plates. Hence, the necessity to provide spring elements in the sealing seat pressing the sealing seat against the shut-off plate is eliminated. This reduces the constructional effort and thus the associated costs and facilitates installation and removal.

In at least one embodiment, the first gas channel and the second gas channel each are in communication with a sealing gas source, wherein different sealing gas sources are provided for the first gas channel and the second gas channel. This enables different sealing gases to be applied to the two circumferential grooves and enables the respective sealing gas pressure in the circumferential grooves to be controlled in a simple manner.

In other embodiments, it is possible for the first gas channel and the second gas channel to be in communication with a common sealing gas source. This reduces the costs and installation effort of the sealing gas source.

In at least one embodiment, the radial distance between the sealing and scraping edge and the first circumferential groove is equal to the radial distance between the first circumferential groove and the second circumferential groove. This ensures sufficiently dimensioned sealing surfaces between the sealing and scraping edge and the circumferential grooves for increasing tightness.

In another embodiment, the first circumferential groove comprises a groove profile differing in groove depth and/or groove width from the groove profile of the second circumferential groove. Thus, the volume to be acted upon with sealing gas may be adjusted as required.

In still other embodiments, the first circumferential groove comprises a groove profile which is identical to the groove profile of the second circumferential groove. This facilitates the manufacturing of the triple sealing seat and thus lowers the manufacturing costs.

Within the context of the invention, a conduit gate valve for chemical and petrochemical plants which comprises a triple sealing seat is further proposed. The conduit gate valve is in this case formed as a single-plate gate valve having a single gate valve plate which during operation can be pressed against the triple sealing seat. Using the inventive triple sealing seat improves the single-plate gate valve's tightness. In addition, the exchanging of the sealing seat is simplified due to the simple construction and the risk of leakages occurring due to wear is reduced.

In still other embodiments, a conduit gate valve for chemical and petrochemical plants within the context of the invention is formed as a double-plate gate valve having two parallel gate valve plates, wherein a gate valve plate may be pressed against an associated triple sealing seat during operation.

In double-plate gate valves, the shut-off plates in the closed position are often forced apart by a wedge mechanism and pressed against their respective sealing seats. In this respect, a mechanism for pressing the shut-off plate against the sealing seat is already present, whereby the inventive triple sealing seat is perfectly suited for use in a double-plate gate valve.

Finally, a method for sealing a shut-off plate of a conduit gate valve using at least one triple sealing seat is proposed in the context of the invention, the inventive method comprising the following steps: pressing a shut-off plate against the associated triple sealing seat for sealing by means of the sealing and scraping edge; and applying sealing gas pressure to the circumferential grooves of the triple sealing seat.

The inventive sealing method offers several advantages. The pressure for sealing is only applied from the shut-off plate side. The triple sealing seat's wear can thus be reduced in two ways. On the one hand, the spring elements usually required in the triple sealing seat for pressing against the shut-off plate are eliminated as components susceptible to wear. On the other hand, the sealing surface of the triple sealing seat that is immovably installed in the conduit gate valve is released from the shut-off plate when the contact pressure is released to move the shut-off plate in the closed position. Thus, excessive wear of the components, which occurs when the shut-off plate is moved while the sealing seat is pressed on, is avoided.

DETAILED DESCRIPTION OF VARIOUS EMBODIMENTS

In the following, the invention will be explained also with respect to further features and advantages by means of an exemplary embodiment which will be explained in more detail based on the single FIGURE.

The single FIGURE shows a section of the triple sealing seat 10 according to an inventive exemplary embodiment. The triple sealing seat 10 is substantially annular and comprises (in FIG. 1 on the bottom) a sealing surface 11 against which a shut-off plate (not shown) is pressed during operation. At the radial interior end of the sealing surface 11, the triple sealing seat 10 comprises a sealing and scraping edge 12 having a small radius and scraping contaminations from the shut-off plate when same is moved between an open and a closed position and upon pressing on the shut-off plate contacts and forms a seal with same.

Radially further outside, the triple sealing seat 10 comprises a first circumferential groove 13a which is concentric with the circumference of the triple sealing seat 10 and extends around the entire triple sealing seat 10. The circumferential groove 13a is in communication with a first gas channel 14a creating a connection to the radial outer surface of the triple sealing seat 10.

Radially further outside, the triple sealing seat 10 finally comprises a second circumferential groove 13b which, like the first circumferential groove 13a, is concentric with the circumference of the triple sealing seat 10 and extends around the entire triple sealing seat 10. The circumferential groove 13b is in communication with a second gas channel 14b creating, just as the first gas channel 14a, a connection to the radial outer surface of the triple sealing seat 10.

Due to the circumferential grooves 13a, 13b, the sealing surface 11 is divided in concentrically arranged sealing surfaces. As shown in the FIGURE, the first circumferential groove 13a divides the sealing surface 11 in two sealing surfaces 11 which are concentric with the triple sealing seat's 10 circumference and, on the one had, extend from the sealing and scraping edge 12 to the first circumferential groove 13a, and, on the other, from the first circumferential groove 13a to the second circumferential groove 13b. Radially outside the second circumferential groove 13b, a further sealing surface 11 extends concentrically up to the circumference of the triple sealing seat 10. Pressing the shut-off plate against the triple sealing seat 10 thus achieves also a sealing in the areas between the sealing and scraping edge 12 and the circumferential grooves 13a, 13b by means of contacting the sealing surfaces 11 with the shut-off plate.

In the installed state, accordingly positioned gas connections (not shown) are provided on the conduit gate valve and will be connected to the gas channels 14a, 14b so as to be able to apply sealing gas pressure to the circumferential grooves 13a, 13b. Since the circumferential grooves 13a, 13b have separate gas channels 14a, 14b. they can be acted upon by different pressures and/or sealing gases or be connected to a common sealing gas source.

The radial distances between the sealing and scraping edge 12 and the first circumferential groove 13a, as well as between the first circumferential groove 13a and the second circumferential groove 13b are not subject to any particular restriction. In FIG. 1, the distance between the sealing and scraping edge 12 and the first circumferential groove 13a is slightly larger than that between the first circumferential groove 13a and the second circumferential groove 13b.

The triple sealing seat 10 shown in FIG. 1 may be used for sealing a shut-off plate both in a single-plate gate valve and a double-plate gate valve. For this purpose, the shut-off plate is pressed against the sealing surface 11, whereby the sealing and scraping edge 12 forms a first seal with the shut-off plate.

An advantageous detail of the invention in this case is that the inventive sealing seat has a triple sealing action. The sealing and scraping edge establishes contact with the shut-off plate and seals against solid matters. Due to the use of two circumferential grooves to which sealing gas is applied, two sealing gas barriers are generated by means of which the conduit gate valve's interior is effectively protected against process gases from a plant to be obturated. The grooves divide the annular sealing surface in this case in at least two concentric sealing surfaces which contribute to seal the areas between the grooves.

With the triple seal being designed in this way, it is furthermore not necessary for the triple sealing seat to be pressed against the shut-off plates. Hence, the necessity to provide spring elements in the sealing seat pressing the sealing seat against the shut-off plate is eliminated. This reduces the constructional effort and thus the associated costs and facilitates installation and removal.

In at least one embodiment, the first gas channel and the second gas channel each are in communication with a sealing gas source, wherein different sealing gas sources are provided for the first gas channel and the second gas channel. This enables different sealing gases to be applied to the two circumferential grooves and enables the respective sealing gas pressure in the circumferential grooves to be controlled in a simple manner.

In still other embodiments, it is possible for the first gas channel and the second gas channel to be in communication with a common sealing gas source. This reduces the costs and installation effort of the sealing gas source.

In certain embodiments, the radial distance between the sealing and scraping edge and the first circumferential groove is equal to the radial distance between the first circumferential groove and the second circumferential groove. This ensures sufficiently dimensioned sealing surfaces between the sealing and scraping edge and the circumferential grooves for increasing tightness.

In at least one embodiment, the first circumferential groove comprises a groove profile differing in groove depth and/or groove width from the groove profile of the second circumferential groove. Thus, the volume to be acted upon with sealing gas may be adjusted as required.

In other various embodiments, the first circumferential groove comprises a groove profile which is identical to the groove profile of the second circumferential groove. This facilitates the manufacturing of the triple sealing seat and thus lowers the manufacturing costs.

Within the context of the invention, a conduit gate valve for chemical and petrochemical plants which comprises a triple sealing seat is further proposed. The conduit gate valve is in this case formed as a single-plate gate valve having a single gate valve plate which during operation can be pressed against the triple sealing seat. Using the inventive triple sealing seat improves the single-plate gate valve's tightness. In addition, the exchanging of the sealing seat is simplified due to the simple construction and the risk of leakages occurring due to wear is reduced.

In another embodiment, a conduit gate valve for chemical and petrochemical plants within the context of the invention is formed as a double-plate gate valve having two parallel gate valve plates, wherein a gate valve plate may be pressed against an associated triple sealing seat during operation.

In double-plate gate valves, the shut-off plates in the closed position are often forced apart by a wedge mechanism and pressed against their respective sealing seats. In this respect, a mechanism for pressing the shut-off plate against the sealing seat is already present, whereby the inventive triple sealing seat is perfectly suited for use in a double-plate gate valve.

Finally, a method for sealing a shut-off plate of a conduit gate valve using at least one triple sealing seat is proposed in the context of the invention, the inventive method comprising the following steps: pressing a shut-off plate against the associated triple sealing seat for sealing by means of the sealing and scraping edge; and applying sealing gas pressure to the circumferential grooves of the triple sealing seat.

The inventive sealing method offers several advantages. The pressure for sealing is only applied from the shut-off plate side. The triple sealing seat's wear can thus be reduced in two ways. On the one hand, the spring elements usually required in the triple sealing seat for pressing against the shut-off plate are eliminated as components susceptible to wear. On the other hand, the sealing surface of the triple sealing seat that is immovably installed in the conduit gate valve is released from the shut-off plate when the contact pressure is released to move the shut-off plate in the closed position. Thus, excessive wear of the components, which occurs when the shut-off plate is moved while the sealing seat is pressed on, is avoided.

LIST OF REFERENCE NUMERALS 10 triple sealing seat
11 sealing surface
12 sealing and scraping edge
13a first circumferential groove
13b second circumferential groove
14a first gas channel
14b second gas channel

The invention claimed is:

1. Triple sealing seat (10) for a conduit gate valve having at least one shut-off plate which is displaceable between an open and closed position with respect to the conduit gate valve, the triple sealing seat (10) comprising:
   a radial interior sealing and scraping edge (12);
   a first circumferential groove (13a) located radially outward relative to the sealing and scraping edge (12), the first circumferential groove (13a) being in communication with a first gas channel (14a) through which a sealing gas pressure is applied;
   a second circumferential groove (13b) located radially outward relative to the first circumferential groove (13a), the second circumferential groove (13b) being in communication with a second gas channel (14b) through which a sealing gas pressure is applied; and
   a substantially annular sealing surface (11),
   wherein:
      the annular sealing surface (11) is divided into at least two concentrically arranged sealing surfaces;
      a first of the at least two concentrically arranged sealing surfaces extends from the radial interior sealing and scraping edge (12) to the first circumferential groove (13a); and
      a second of the at least two concentrically arranged sealing surfaces extends from the first circumferential groove (13a) to the second circumferential groove (13b).

2. Triple sealing seat (10) according to claim 1, wherein the first gas channel (14a) and the second gas channel (14b) each are in communication with a respective sealing gas source, wherein different sealing gas sources are provided for the first gas channel (14a) and the second gas channel (14b).

3. Triple sealing seat (10) according to claim 1, wherein the first gas channel (14a) and the second gas channel (14b) are in communication with a common sealing gas source.

4. Triple sealing seat (10) according to claim 1, wherein the radial distance between the sealing and scraping edge (12) and the first circumferential groove (13a) is equal to the radial distance between the first circumferential groove (13a) and the second circumferential groove (13b).

5. Triple sealing seat (10) according to claim 1, wherein the first circumferential groove (13a) comprises a groove profile differing in at least one of groove depth or groove width from the groove profile of the second circumferential groove (13b).

6. Triple sealing seat (10) according to claim 1, wherein the first circumferential groove (13a) comprises a groove profile which is identical to the groove profile of the second circumferential groove (13b).

7. Conduit gate valve for chemical and petrochemical plants, said conduit gate valve comprising a triple sealing seat (10) according to claim 1, wherein the conduit gate valve is a single-plate gate valve further having a single shut-off plate that is pressed against the triple sealing seat (10) during operation.

8. Conduit gate valve for chemical and petrochemical plants, said conduit gate valve comprising at least one triple sealing seat (10) according to claim 1, wherein the conduit gate valve is a double-plate gate valve further having two parallel shut-off plates, wherein each of the two parallel shut-off plates are pressed against an associated triple sealing seat (10) during operation.

* * * * *